United States Patent
Martinez et al.

(10) Patent No.: US 10,276,180 B2
(45) Date of Patent: Apr. 30, 2019

(54) AUDIO COMMAND ADAPTIVE PROCESSING SYSTEM AND METHOD

(71) Applicant: HONEYWELL INTERNATIONAL INC., Morristown, NJ (US)

(72) Inventors: Steven Martinez, Albuquerque, NM (US); Stephen Mead, Bradenton, FL (US); Vasantha Selvi Paulraj, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1022 days.

(21) Appl. No.: 14/336,181

(22) Filed: Jul. 21, 2014

(65) Prior Publication Data

US 2016/0019891 A1 Jan. 21, 2016

(51) Int. Cl.
*G10L 21/00* (2013.01)
*G10L 21/0216* (2013.01)
*G10L 25/00* (2013.01)

(52) U.S. Cl.
CPC ...... *G10L 21/0216* (2013.01); *B64C 2220/00* (2013.01); *G10L 2021/02165* (2013.01)

(58) Field of Classification Search
CPC ....... G10L 21/0216; G10L 2021/02165; G10L 15/22; G10L 21/0232; G10L 21/10; G10L 15/265; G10L 2015/223; B64C 2220/00
USPC ...................................................... 704/275
See application file for complete search history.

(56) References Cited

U.S. PATENT DOCUMENTS

| | | | |
|---|---|---|---|
| 6,859,773 B2 | 2/2005 | Breton | |
| 7,079,645 B1 * | 7/2006 | Short | H04M 1/6016 379/387.01 |
| 7,676,363 B2 | 3/2010 | Chengalvarayan et al. | |
| 8,504,362 B2 | 8/2013 | Lee et al. | |
| 8,515,763 B2 * | 8/2013 | Dong | G10L 15/22 701/14 |

(Continued)

FOREIGN PATENT DOCUMENTS

| | | |
|---|---|---|
| EP | 0332890 A2 | 9/1989 |
| EP | 2337024 A1 | 6/2011 |

(Continued)

OTHER PUBLICATIONS

Mporas, I. et al.; Context-Adaptive Pre-Processing Scheme for Robust Speech Recognition in Fast-Varying Noise Environment; Signal Processing 91 (2011) 20\101-2111; journal homepage: www.elsevier.com/locate/sigpro.

(Continued)

*Primary Examiner* — Thierry L Pham
(74) *Attorney, Agent, or Firm* — Lorenz & Kopf, LLP

(57) ABSTRACT

A system and method are provided for adaptively processing audio commands supplied by a user in an aircraft cabin, and includes receiving ambient noise in the aircraft cabin via one or more audio input device, sampling, with a processor, the received ambient noise, and analyzing, in the processor, the sampled ambient noise and, based on the analysis, selecting one or more filter functions and adjusting one or more filter parameters associated with the one or more selected filter functions. Audio and ambient noise are selectively received via the one or more audio input devices, and are filtered, through the selected one or more filter functions, to thereby supply filtered audio.

15 Claims, 3 Drawing Sheets

(56) References Cited

U.S. PATENT DOCUMENTS

| | | |
|---|---|---|
| 8,600,741 B2 | 12/2013 | Talwar et al. |
| 2013/0030803 A1 | 1/2013 | Liao |
| 2014/0079234 A1 | 3/2014 | Butts et al. |

FOREIGN PATENT DOCUMENTS

| | | |
|---|---|---|
| EP | 2405422 A1 | 1/2012 |
| GB | 2377805 A | 1/2003 |

OTHER PUBLICATIONS

Garmin, GMA 350; http://buy.garmin.com/en-GB/GB/aviation/avionics/audio-panels/gma-350/prod64297.html.
Extended EP Search Report for Application No. 15176182.2-1901 dated Dec. 15, 2015.
Widrow, B. et al.; Adaptive Noise Cancelling: Principles and Application; Proceedings of the IEEE, IEEE. New York, US, vol. 63, No. 12, Dec. 1, 1975, pp. 1692-1716.
EP Examination Report for Application No. 15 176 182.2-1901 dated Jul. 7, 2017.

* cited by examiner

AUDIO COMMAND ADAPTIVE PROCESSING SYSTEM AND METHOD

TECHNICAL FIELD

The present invention generally relates systems and methods for processing audio commands, and more particularly relates to systems and methods for adaptively filtering and processing audio commands.

BACKGROUND

When processing voice to recognize certain words, the audio that represents the voice comes in from one or more audio input devices and is subject to some ambient removal to improve recognition. In most cases, one audio input device provides audio-plus-ambient sound, and another audio input device, which is often disposed directionally away from the user, to a first approximation provides only ambient noise. The signals (ambient plus voice and ambient only) from the two audio input devices are subtracted leaving voice.

This capability is presently implemented in many smartphones and other handheld devices. Due to either the nature of the ambient noise or the magnitude of the ambient noise, this capability is only marginally effective in an aircraft cabin environment. For example, in a test where an unfiltered audio sample with typical aircraft engine noise in a cabin and the same sample without the engine noise were applied to an untrained voice recognizer it was found that accuracy drops from a recognition rate of just over 70% down to 4%.

Numerous filters and acoustic modeling techniques have been developed to improve recognition rates. However, it has been discovered that some filters and acoustic modeling techniques that increase recognition rates under one ambient noise condition (e.g. aircraft engine noise when at cruise) often decrease recognition rates under different ambient noise conditions (e.g. engine noise at take-off, after landing, or on a different aircraft).

The wrong filter and/or acoustic modeling technique can ultimately make recognition rates undesirably low. Reduced single-word recognition can affect the state processing of multiword "natural" language recognition where each missed keyword becomes a single point of failure. Moreover, false positive recognitions can result in an erroneous keyword which redirects the multiword recognition towards an erroneous path of options.

Hence, there is a need for a system and method that provides improved recognition rates across different ambient noise conditions in an aircraft cabin environment. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method for adaptively processing audio commands supplied by a user in an aircraft cabin includes receiving ambient noise in the aircraft cabin via one or more audio input device, sampling, with a processor, the received ambient noise, analyzing, in the processor, the sampled ambient noise and, based on the analysis, selecting one or more filter functions and adjusting one or more filter parameters associated with the one or more selected filter functions. Audio and ambient noise are selectively received via the one or more audio input devices, and are filtered, through the selected one or more filter functions, to thereby supply filtered audio.

In another embodiment, a system for adaptively processing audio commands supplied by a user in an aircraft cabin includes one or more audio input devices, and a processing system. The one or more audio input devices are adapted to receive ambient noise in the aircraft cabin and supply ambient noise signals representative thereof, and to at least selectively receive audio and ambient noise and supply audio signals representative thereof. The processing system is in operable communication with the one or more audio input devices, and is configured to: (i) sample and analyze the received ambient noise and, based on the analysis, implement one or more filter functions and adjust one or more filter parameters associated with the one or more selected filter functions, and (ii) filter, through the selected one or more filter functions, the audio and ambient noise supplied to the one or more audio input devices, to thereby supply filtered audio.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
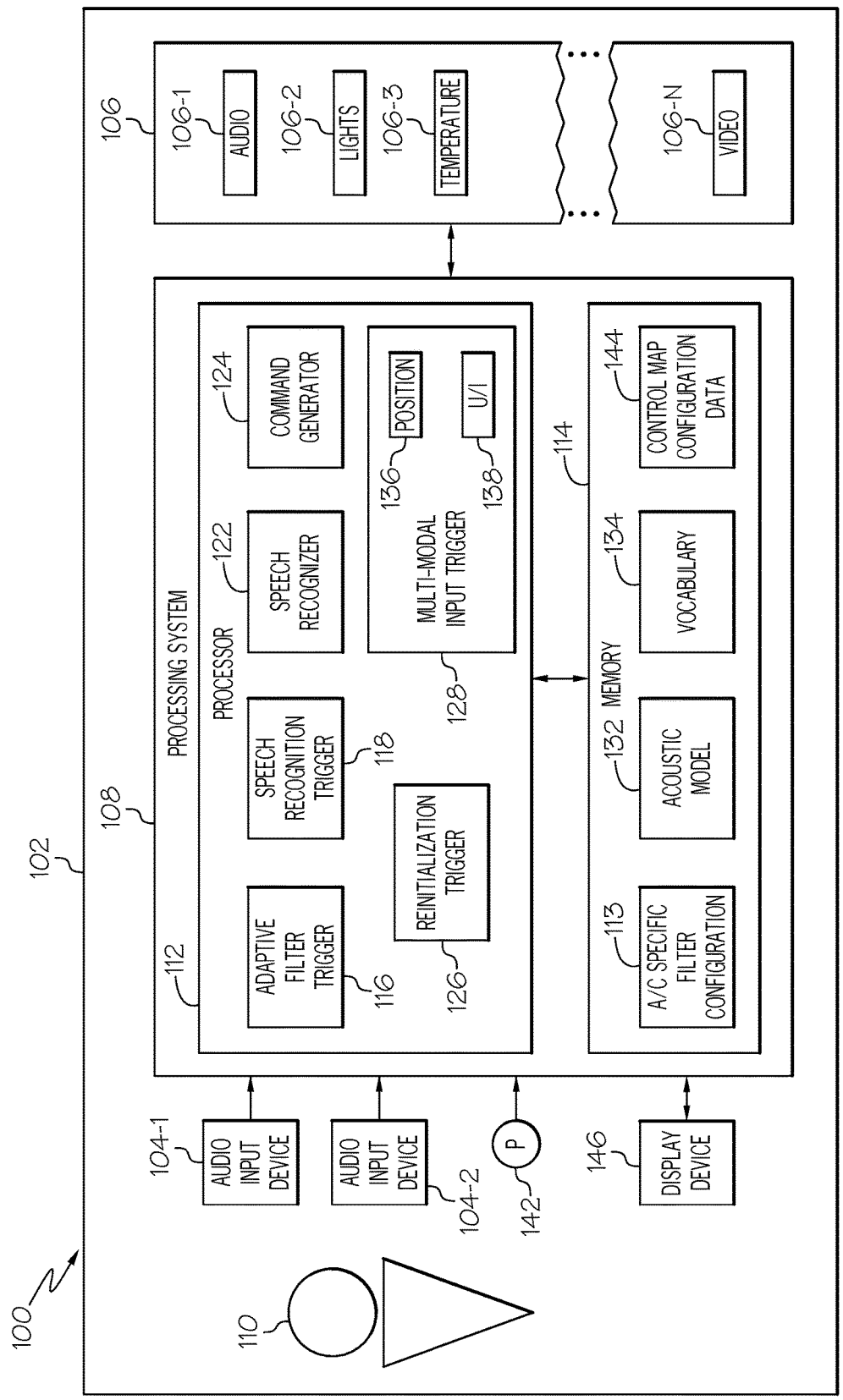
FIG. 1 depicts a simplified functional block diagram of an exemplary embodiment of a voice-commanded aircraft cabin control system.

Referring to FIG. 1, a simplified functional block diagram of an exemplary embodiment of a voice-commanded aircraft cabin control system 100 is depicted. The depicted system 100, which is preferably disposed within a vehicle 102 such as an aircraft, includes one or more audio input devices 104, a plurality of controllable cabin components 106 (106-1, 106-2, 106-3 . . . , 106-N), and a processing system 108. In the depicted embodiment, the system 100 is implemented using two audio input devices—a first audio input device 104-1 and a second audio input device 104-2. It will be appreciated, however, that this is merely exemplary, and that in other embodiments the system 100 may be implemented with only a single audio device 104

In the depicted embodiment, the first audio input device 104-1 is adapted to receive ambient noise in the aircraft cabin and supply ambient noise signals representative thereof, and the second audio input device is adapted to at least selectively receive audio and ambient noise and supply audio signals representative thereof. Preferably, the first audio input device 104-1 is disposed away from the second audio input device 104-2 such that the first audio input device 104-1 receives only ambient noise, whereas the second audio device 104-2 receives both audio and ambient noise.

It will be appreciated that the audio input device(s) 104 may be variously implemented and disposed. For example, the audio input device(s) 104 may be implemented using a microphone, an audio transducer, an audio sensor, or any one of numerous other suitable devices adapted to receive or otherwise sense audio input from a user 110. In some embodiments, the audio input device(s) 104 may be integrated as part of another device, such as a smart phone or other hand-held device. The audio input device(s) 104 may also, in some embodiments, include an activation element that comprises a physical feature, such as a button or switch, which may be utilized to enable or otherwise activate the audio input device(s) 104 (e.g., push-to-talk).

The controllable cabin components 106 are in operable communication with (either wired or wirelessly) the processing system 108. The controllable cabin components 106 are each adapted to receive aircraft cabin control commands that are supplied thereto by the processing system 108 and are configured, upon receipt thereof, to implement the command. The controllable cabin components 106 may vary in number and type. In the depicted embodiment, the controllable cabin components 106 include one or more audio devices 106-1, one or more lights 106-2, one or more temperature control devices 106-3, and one or more video devices 106-N. It will be appreciated that the depicted components 106 are merely exemplary, and that the system 100 may include additional controllable components that are responsive to commands supplied by the processing system 108.

The processing system 108 is in operable communication (either wired or wirelessly) with the first 104-1 and second 104-2 audio input devices. It will be appreciated that the processing system 108 may be variously implemented and disposed. For example, it may be implemented using one or more processors that are included in one or more systems in the vehicle 102. In some embodiments, the processing system 108 is integrated as part of another device, such as a smart phone or other hand-held device, and may be included in the same hand-held device as the audio input devices 104. Regardless of its implementation and location, the processing system 108 is configured, upon receipt of the audio signals from the second audio input device 104-2, to selectively generate aircraft cabin control commands, and supply the aircraft cabin control commands to the appropriate controllable cabin component(s) 106.

The processing system 108 includes memory 112 and a processor 114. The memory 112, which may be variously configured and implemented, has aircraft-specific filter configuration data 1130 stored therein. The aircraft-specific filter configuration data include data representative of various filter functions. The filter functions may vary and include low-pass filters, high-pass filters, band-pass filters, equalizers, and spectral subtraction filters, just to name a few. The aircraft-specific filter configuration data also preferably includes information regarding ambient noise level ranges and a filter function map. As is generally known, each filter function has different parameters associated therewith. Some of the associated parameters, it has been found, work best in certain aircraft or aircraft types, and at certain noise levels within these different aircraft or aircraft type. As such, the aircraft-specific configuration data also include data representative of these varying filter parameters associated with the various filter functions. Moreover, because more than one filter function may be applied, the aircraft-specific configuration data also include data representative of the order in which filter functions are to be applied, if more than one filter function is to be applied.

Figure 2:
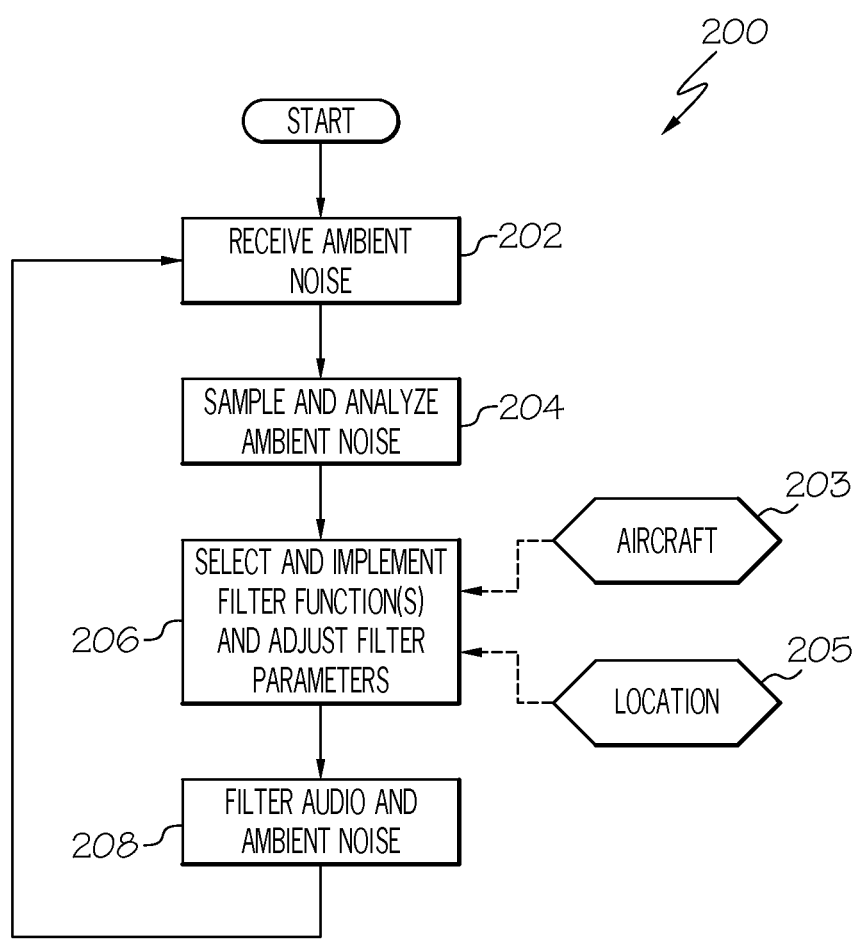
FIG. 2 depicts a process, in flowchart form, that the system of FIG. 1 implements to actively and adaptively implement one of the filter functions.

The processor 114 is in operable communication with the audio input devices 104 and with the memory 112, and is configured to implement various functions. Included among these functions are an adaptive filter trigger 116, a speech recognition trigger 118, a speech recognizer 122, command generator 124, a re-initialization trigger 126, and a multimodal input trigger 128. The adaptive filter trigger 116 implements a process to actively and adaptively implement one of the filter functions stored in the memory 112. This process 200 is depicted more clearly in flowchart form in FIG. 2, and with reference thereto will now be described.

The first audio input device 104-1 receives (either selectively or continuously) ambient noise (202). The adaptive filter trigger 116 continuously samples and analyzes the received ambient (204). Before proceeding further, it is noted that the analysis the adaptive filter function 116 implements may vary. In one particular embodiment, the adaptive filter function 116 analyzes the sampled ambient noise for power in specific frequency bands. In some embodiments, the analysis of the power in the frequency bands may be a simple comparison to a threshold value.

Returning to the process 200, the adaptive filter trigger 116, based on the analysis of the received ambient noise, selects and implements one or more of the filter functions stored in memory 112, and adjusts one or more of the associated filter parameters that are also stored in memory 112 (206). As noted above, some of the associated parameters work best in certain aircraft or aircraft types, and at certain noise levels within these different aircraft or aircraft type, and with the location within these different aircraft or aircraft types. Thus, the adaptive filter function 116, at least in some embodiments, may also be adapted to receive data representative of aircraft type (203), and data representative of the location with the determined aircraft type (205). The one or more filter types and the one or more filter parameters may also be selected based on these data.

After the filter function(s) is (are) selected and the associated filter parameters are adjusted, the audio and ambient noise supplied to the second audio input device 104-2 are filtered using the selected filter functions(s) (208). The adaptive filter trigger 116 thus supplies filtered audio to the speech recognition trigger 118.

Figure 3:
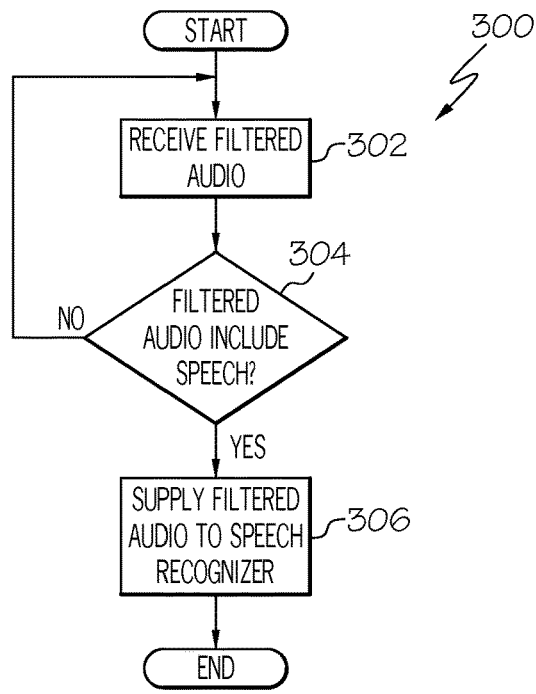
FIG. 3 depicts a process, in flowchart form, that the system of FIG. 1 implements to selectively supply filtered audio to a speech recognizer.

The speech recognition trigger 118 implements a process to selectively supply the filtered audio to the speech recognizer 122. This process 300 is depicted in flowchart form in FIG. 3, and includes receiving the filtered audio from the adaptive filter trigger 116 (302), and then analyzing the filtered audio to determine when it includes human speech (304). The specific analysis implemented by the speech recognition trigger 118 may vary, but in the depicted embodiment the sound pressure level (SPL) of the ambient noise sample may be compared to the sample that may contain speech. If the SPL exceeds a predetermined threshold value, then it likely contains an additional sound source (e.g., speech). Alternatively, the spectral energy could be analyzed to determine if the frequency fingerprint associated with speech is present to a sufficient level to trigger the threshold where speech is deemed present.

Regardless of the specific analysis, if the analysis determines that human speech is present in the filtered audio (using the previously selected filter function(s) and parameters), the speech recognition trigger 118 supplies the filtered audio to the speech recognizer 122 (306). If not, then the speech recognition trigger 118 awaits more filtered audio from the adaptive filter trigger 116.

The speech recognizer 122 receives the filtered audio from the speech recognition trigger 118, and determines the words that are included in the human speech. The speech recognizer 122 may implement any one of numerous speech recognition processes. In the depicted embodiment, the speech recognizer 122 uses an acoustic model 132 and a vocabulary 134 that is tuned for aircraft cabin management command words. The determined words are supplied to the command generator 124 for semantic analysis and generation of the appropriate aircraft cabin control command. As with the speech recognizer 122, the command generator 124 may implement any one of numerous processes to process the determined words and generate the appropriate aircraft cabin control command therefrom.

A typical aircraft cabin control command phrase consists of less than ten words. However, because of the presence of background noise, the speech recognition trigger 118 may determine that human speech is present, when in fact there is none. When this occurs, the speech recognizer 122 may continue to produce false positive words, even after the user 110 has stopped speaking. The re-initialization trigger 126 is configured to prevent, or at least inhibit, this potential shortcoming.

Figure 4:
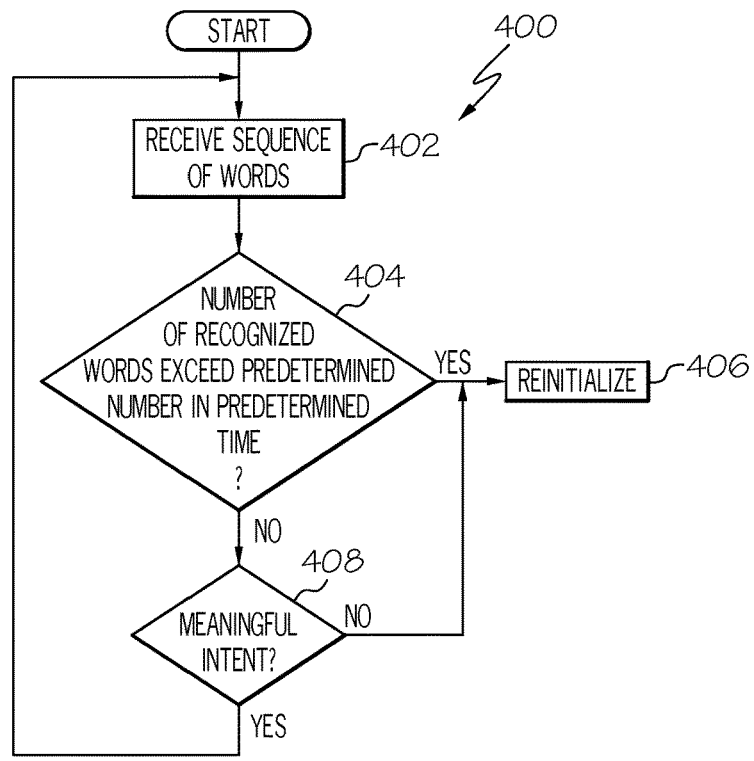
FIG. 4 depicts a re-initialization process, in flowchart form, that the system of FIG. 1 implements.

To do so, and as shown in flowchart form in FIG. 4, the re-initialization trigger 126 monitors the time it has been since no speech has occurred (using the same criteria that are used to determine if speech is present). In the depicted embodiment, the re-initialization trigger 126 also monitors the sequence of words output by the speech recognizer 124 (402), and then determines when a number of recognized words exceeds a predetermined number within a predetermined time period (404). It is noted, however, that this latter function is optional, and may be implemented as a backup in case there is a loud noise that is confused with speech. If the number of recognized words exceeds the predetermined number within the predetermined time, the re-initialization trigger 126 triggers a re-initialization (406). In addition, if the command generator 124 fails to determine any meaningful aircraft cabin control command with the predetermined time period (408), the re-initialization trigger 126 also triggers the re-initialization (406). The re-initialization causes the one or more filter functions to be re-initialized, which in turn also cuts off the input to the speech recognizer 122. This re-initialization process 400 allows the adaptive filter trigger 116 to reset and re-adapt to the current ambient noise.

The multi-modal input trigger 128, at least in the depicted embodiment, implements two types of triggers—a position trigger 136 and a user interface trigger 138. The position trigger 136 is provided because, in an aircraft cabin environment, the controls and/or user interface are often personalized for a user's seat. Hence, the position trigger 136 supplies position data representative of the position of the user 110 within the aircraft cabin to the command generator 124. The position data may be generated based on data supplied from one or more sensors within a seat or in proximity thereof, from a GPS, or any one of numerous other position sensing and/or determining devices 142. The command generator 124 generates aircraft cabin control commands based not just on the one or more recognized words supplied from the speech recognizer, but also on the position of the user 110. In particular, the command generator 124 determines the nearest controls that may be personalized for the position of the user 110. For example, if the user 110 supplies the command of "lights on," the command generator 124 may refer, for example, to control map configuration data 144, which may be stored in memory 112. The control map configuration data 144 are representative of the controls at or near the user's position, and can thereby better determine which lights the command should be applied.

The user interface trigger 138 is used for controlling relative numbers such as increasing or decreasing volume, brightening or dimming lights, controlling temperature, and the like. When the command generator 124 determines that the aircraft cabin control command includes certain action setting words, such as "set," "reduce," "lower, "increase," decrease, or the like, along with contextual words, such as "lights," "temperature," "volume," or the like, the command generator 124 refers to the control map configuration data 144 and, based on these data, commands a display device 146 to render one or more user interfaces based on the recognized words. The rendered user interfaces may be a slider, one or more buttons, one or more switches, or the like, just to name a few.

The system and method described herein increases the effectiveness of commanding an aircraft cabin management system through voice by providing improved recognition rates across different ambient noise conditions in an aircraft cabin environment.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for adaptively processing audio commands supplied by a user in an aircraft cabin, comprising the steps of:
   receiving ambient noise in the aircraft cabin via a first audio input device;
   continuously sampling, with a processor, the ambient noise received via the first audio input device;
   determining, in the processor, an aircraft type and a location within the determined aircraft type;
   continuously analyzing, in the processor, the sampled ambient noise and, based on the continuous analysis, the determined aircraft type and, the determined location within the determined aircraft type, selecting one or more filter functions and adjusting one or more filter parameters associated with the one or more selected filter functions;
   selectively receiving audio and ambient noise via a second audio input device; and
   filtering, through the selected one or more filter functions, the audio and ambient noise received via the second audio input device, to thereby supply filtered audio.

2. The method of claim 1, wherein:
   the step of continuously analyzing comprises continuously analyzing the sampled ambient noise for power in specific frequency bands; and
   the step of selecting the one or more filter types and adjusting the one or more filter parameters is based at least in part on the power in one or more of the specific frequency bands.

3. The method of claim 1, further comprising:
   analyzing the audio received by the second audio input devices to determine when it includes human speech, and
   supplying the filtered audio to a speech recognizer when it is determined that the audio received by the second audio input device includes human speech,
   wherein the speech recognizer supplies one or more recognized words.

4. The method of claim 3, further comprising:
   determining when a number of recognized words exceeds a predetermined number within a predetermined time period; and
   re-initializing the one or more filter functions when is determined that the number of recognized words exceeds the predetermined number within the predetermined time period.

5. The method of claim 3, further comprising:
   analyzing the one or more recognized words to discern an intent thereof; and
   re-initializing the one or more filter functions when the intent cannot be discerned.

6. The method of claim 1, further comprising:
   determining a position of the user within the aircraft cabin;
   at least selectively generating an aircraft cabin control command based on the one or more recognized words and on the position of the user.

7. The method of claim 1, further comprising:
   selectively rendering, on a display device, one or more user interfaces based on the one or more recognized words.

8. A system for adaptively processing audio commands supplied by a user in an aircraft cabin, comprising:
- a first audio input device adapted to receive ambient noise in the aircraft cabin and supply ambient noise signals representative thereof;
- a second audio input device adapted to at least selectively receive audio and ambient noise and supply audio signals representative thereof; and
- a processing system in operable communication with the first and second audio input devices, the processing system configured to:
  (i) receive data representative of an aircraft type,
  (ii) receive data representative of a location within the determined aircraft type,
  (iii) continuously sample and analyze the received ambient noise and, based on the continuous analysis, the aircraft type, and the location within the aircraft type, implement one or more filter functions and adjust one or more filter parameters associated with the one or more selected filter functions, and
  (iv) filter, through the selected one or more filter functions, the audio and ambient noise received by the second audio input device, to thereby supply filtered audio.

9. The system of claim 8, wherein the processing system is further configured to:
- continuously analyze the sampled ambient noise for power in specific frequency bands;
- select the one or more filter types and adjust the one or more filter parameters based at least in part on the power in one or more of the specific frequency bands.

10. The system of claim 8, wherein the processing system is further configured to:
- implement a speech recognizer that supplies one or more recognized words;
- analyze the audio supplied to second audio input device to determine when it includes human speech; and
- process the filtered audio in the speech recognizer when it is determined that the audio supplied to the second audio input device includes human speech.

11. The system of claim 10, wherein the processing system is further configured to:
- determine when a number of recognized words exceeds a predetermined number within a predetermined time period; and
- re-initialize the one or more filter functions when is determined that the number of recognized words exceeds the predetermined number within the predetermined time period.

12. The system of claim 11, wherein the processing system is further configured to:
- analyze the one or more recognized words to discern an intent thereof; and
- re-initialize the one or more filter functions when the intent cannot be discerned.

13. The system of claim 10, wherein the processing system is further configured to:
- receive data representative of a position of the user within the aircraft cabin; and
- at least selectively generate an aircraft cabin control command based on the one or more recognized words and on the position of the user.

14. The system of claim 10, further comprising:
- a display device in operable communication with the processing system,
- wherein the processing system is further configured to selectively render, on the display device, one or more user interfaces based on the one or more recognized words.

15. A system for adaptively processing audio commands supplied by a user in an aircraft cabin, comprising:
- a first audio input device adapted to receive ambient noise in the aircraft cabin and supply ambient noise signals representative thereof;
- a second audio input device adapted to at least selectively receive audio and ambient noise and supply audio signals representative thereof; and
- a processing system in operable communication with the first and second audio input devices, the processing system configured to:
  (i) continuously sample and analyze the received ambient noise and, based on the continuous analysis, implement one or more filter functions and adjust one or more filter parameters associated with the one or more selected filter functions,
  (ii) filter, through the selected one or more filter functions, the audio and ambient noise received by the second audio input device, to thereby supply filtered audio;
  (iii) receive data representative of a position of the user within the aircraft cabin,
  (iv) implement a speech recognizer that supplies one or more recognized words,
  (v) analyze the audio supplied to second audio input device to determine when it includes human speech,
  (vi) process the filtered audio in the speech recognizer when it is determined that the audio supplied to the second audio input device includes human speech, and
  (vii) at least selectively generate an aircraft cabin control command based on the one or more recognized words and on the position of the user.

* * * * *